(12) United States Patent
Chay

(10) Patent No.: US 11,468,522 B2
(45) Date of Patent: Oct. 11, 2022

(54) PERSONAL CURRENCY IN A BLOCKCHAIN SYSTEM

(71) Applicant: Eversus International Limited, Wanchai (HK)

(72) Inventor: Fung Tien Chay, Wanchai (HK)

(73) Assignee: EVERSUS INTERNATIONAL LIMITED, Wanchai (HK)

(*) Notice: Subject to any disclaimer, the term of this patent is extended or adjusted under 35 U.S.C. 154(b) by 664 days.

(21) Appl. No.: 16/396,720

(22) Filed: Apr. 28, 2019

(65) Prior Publication Data
US 2020/0342546 A1    Oct. 29, 2020

(51) Int. Cl.
| | |
|---|---|
| G06Q 10/10 | (2012.01) |
| G06Q 30/02 | (2012.01) |
| G06Q 10/06 | (2012.01) |
| G06Q 30/06 | (2012.01) |
| G06Q 50/00 | (2012.01) |
| G06Q 20/36 | (2012.01) |
| G06F 16/27 | (2019.01) |

(52) U.S. Cl.
CPC ........... *G06Q 50/01* (2013.01); *G06F 16/27* (2019.01); *G06Q 20/363* (2013.01)

(58) Field of Classification Search
CPC .... G06Q 50/01; G06Q 50/265; G06Q 20/363; G06Q 20/223; G06F 16/27

USPC .................... 705/1.1–912, 319, 325
See application file for complete search history.

(56) References Cited

U.S. PATENT DOCUMENTS

| | | | |
|---|---|---|---|
| 11,177,937 B1* | 11/2021 | McCown | H04L 9/32 |
| 2017/0364637 A1* | 12/2017 | Kshepakaran | G16Z 99/00 |
| 2019/0159677 A1* | 5/2019 | Soyao | G16H 20/10 |
| 2020/0251213 A1* | 8/2020 | Tran | G16H 50/70 |

* cited by examiner

*Primary Examiner* — Jonathan P Ouellette
(74) *Attorney, Agent, or Firm* — Pete Adams Law, PLLC

(57) ABSTRACT

A blockchain system based on at least one individual, having a virtual currency means of storing of personal virtual currency based on a personal identity of the individual; a personal history medium including personal history data, characterised in that the personal history data has: a value medium for storing a virtual human value relating to the individual, in which the system having the personal history data performs scoring on the personal identity based on the virtual human value, the biographical data and the virtual family tree, such that the personal identity scoring will set or store at least one value for the personal virtual currency in the blockchain system to perform virtual transactions with other individual or corporations. The blockchain system stores data collected from IOT embedded devices and other computing devices, enabling individuals to connect in a global social network based on family trees.

10 Claims, 2 Drawing Sheets

| Individual Name | Value | Human History & Biography | Family Tree and reciprocal relationships links |
|---|---|---|---|
| Jibby | JB $ | Jibby History | Jibby Family Tree |
| John Low | JL $ | John Low History | John Low Family Tree |
| Wong | W $ | Wong History | Wong Family Tree |

PERSONAL CURRENCY IN A BLOCKCHAIN SYSTEM

BACKGROUND OF THE INVENTION

1. Field of the Invention

The present invention relates to a blockchain system, and in particular to personal identity scoring based on at least one individual and based on blockchain technologies.

2. Description of Related Art

A blockchain is a list of records, called blocks, which are linked securely using cryptography. Each block may contain a link to a previous block, a timestamp, and transactional details. A blockchain may be managed by a peer-to-peer network of nodes collectively adhering to a consensus protocol for validating new blocks. Typically, once recorded, the transaction data in a given block cannot be altered retroactively without the alteration of all previous blocks, which requires collusion of a majority of the network nodes.

The blockchain distributed database maintains continuously growing list of ordered records which can be used as an open, distributed ledger to record transactions among parties efficiently and in a verifiable manner. Hence, blockchains are suitable for the recording of events, records, transaction processing, and proving origin.

In many traditional societies, family trees are widely recorded and spread. However, currently people often migrate so that members of a family are spread in many areas and they are disconnected. Family trees have been used in many fields, such as connection of relatives, inheritance of estate, marriages, etc. The Internet is widely used globally and thus it is possible to use the Internet for building family trees. The Internet of Things (IOT), particularly IOT embedded devices, may be used to track and record data on the activities of individuals. Such activity data can be recorded in blockchains. However, blockchain is not currently used for recording personal identity, in particular creating a personal blockchain based on at least one individual or personal identity. Therefore, there is a need in the technical field for a blockchain that stores personal data, including data collected from IOT embedded devices and other computing devices, to enable the connection of individuals in a global social network based on family trees.

SUMMARY OF THE INVENTION

One embodiment of the invention relates to a blockchain system based on at least one individual, having: a virtual currency means of storing at least one personal virtual currency based on a personal identity of the individual; a personal history medium having at least one personal history, data having a plurality of historical data of the individual, characterised in that the personal history data comprises: a value medium for storing a virtual human value relating to the individual, wherein the virtual human value is mined and compiled from social status or social score of the individual, achievement achieved or award nominated by the individual, competency of the individual, academic status of the individual, and influencer score based affect that has the ability to influence decisions of other individuals; a biodata medium for storing biographical data relating to the personal identity having name, address, date of birth, gender, marital status, work experience, job scope, training or seminars attended, affiliations and reciprocal relationships, wherein the biographical data is further mined and sorted from health records, activity records, and social network data; and a family tree medium for storing a virtual family tree formed based on family historical data of the individual, where the family historical data is mined from the reciprocal relationships listed in the biographical data, and linking data of related personal identity from the reciprocal relationships, in which the system having the personal history data performs scoring on the personal identity based on the virtual human value, the biographical data and the virtual family tree, such that the personal identity scoring will set or store at least one value for the personal virtual currency in the blockchain system to perform virtual transactions with other individual or corporations. A mobile wallet may be used as the virtual currency means for storing personal virtual currencies based on personal identities of individuals.

Activity records include data collected from IOT embedded devices ("embedded devices") such as wearable tracking devices and household devices. Activity records may also include data obtained from computing devices such as mobile phones, tablets, or laptops.

Further, the personal virtual currency may be linked to the individual's country scoring which relates to a country's economic activity or Gross Domestic Product (GDP) for the valuation of the personal virtual currency.

Further, the personal virtual currency may be valued based on individual behaviour and activity, in which data relating to the individual behaviour and activity is mined from at least one tracking or surveillance medium or system.

Further, the personal virtual currency may be valued based on a merit and demerit point system which allows the individual to efficiently function as a contributing member of society.

Further, the personal virtual currency may be valued based on an ability projection of the individual. Artificial Intelligence can perform the functions necessary to make ability projections.

Further, the system may further comprise opportunity scoring means for calculating scoring based on the human value for the valuation of the personal virtual currency.

Further, the system may further comprise a connection medium for a trace family tree and establish a virtual connection for communication and interaction with the individual.

Further, the family tree medium may be used for the valuation of the personal virtual currency.

Further, the valuation of the personal virtual currency may be based on government's records of the individual, or the individual and the reciprocal relationships of the individual.

Another embodiment of the invention has personal history data including an autobiography. Further, the personal history data may include a biography.

The present invention consists of features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF THE DRAWINGS

To further clarify various aspects of some embodiments of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the accompanying drawings.

DETAILED DESCRIPTION OF THE INVENTION

Figures 1, 2:
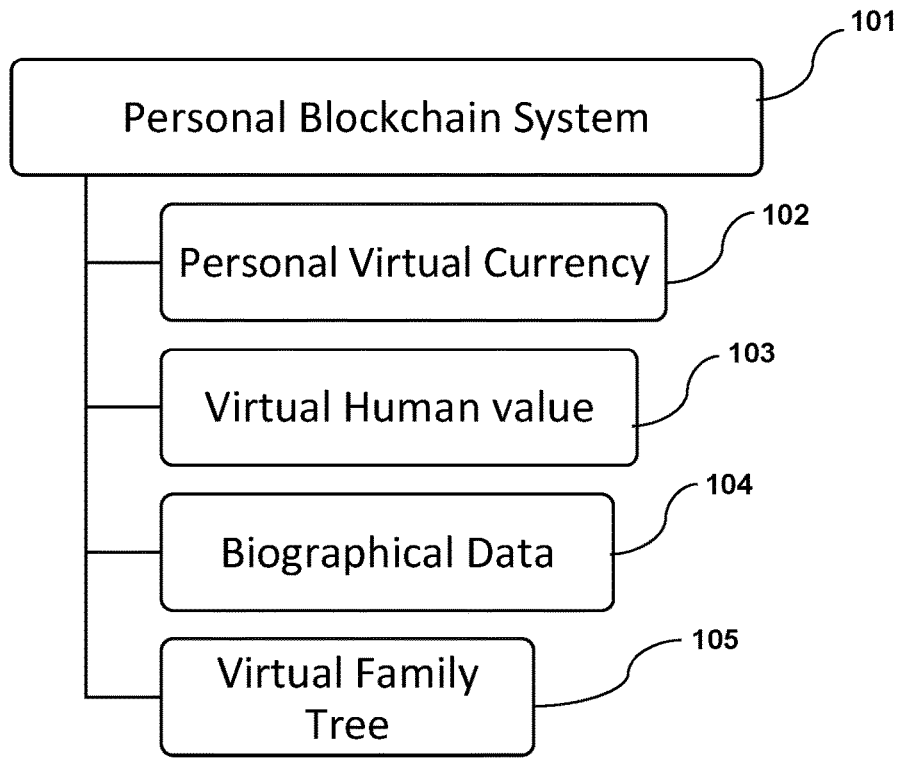
FIG. 1 illustrates a personal blockchain system and the data encrypted to the system.
FIG. 2 illustrates a blockchain system based on at least one individual.

The following descriptions relate to presently preferred embodiments and are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more.

The following descriptions relate principally to preferred embodiments while a few alternative embodiments may also be referenced on occasion, although it should be understood that many other alternative embodiments would also fall within the scope of the invention. It should be appreciated by those of ordinary skill in the art that the techniques disclosed in these examples are thought to represent techniques that function well in the practice of various embodiments, and thus can be considered to constitute preferred modes for their practice. However, considering the present disclosure, those of ordinary skill in the art should also appreciate that many changes can be made relative to the disclosed embodiments while still obtaining a comparable function or result without departing from the spirit and scope of the invention.

The present disclosure relates to a blockchain system based on at least one individual or a virtual recorded personal identity of the individual. The blockchain system has a virtual currency means for storing at least one personal virtual currency based on a personal identity of the individual. A mobile wallet may be used as the virtual currency means for storing personal virtual currencies based on personal identities of individuals. As well known in the art, a mobile wallet refers to a blockchain storage system. Mobile wallets are used to store cryptocurrencies. Sometimes, mobile wallets may be referred to as "hot wallets." The blockchain system also has a personal history medium having at least one personal history data having a plurality of historical data of the individual.

The personal history data or medium includes a value medium for storing a virtual human value relating to the individual, wherein the virtual human value is mined and compiled from social status or social score of the individual, achievement achieved or award nominated by the individual, competency of the individual, academic status of the individual, and influencer score based affect that has the ability to influence decisions of others individual.

The personal history data or medium further includes a biodata medium for storing biographical data relating to the personal identity having name, address, date of birth, gender, marital status, work experience, job scope, training or seminars attended, affiliations and reciprocal relationships, wherein the biographical data is further mined and sorted from health records, activity records, and social network data. Reciprocal relationships refer to friendships and the like. For example, if an individual makes a social media post and another person "likes" the post, this may imply that the individuals are in a reciprocal relationship. Activity records include data collected from IOT embedded devices ("embedded devices") such as wearable tracking devices and household devices. Wearable tracking devices are embedded devices worn by an individual. For example, wearable tracking devices may be embedded into an individual's clothing, shoes, watches, sunglasses, spectacles/glasses, and other wearable devices. Activity records may include data tracked and recorded from wearable tracking devices such as an individual's food consumption, liquid/fluid consumption, heartbeat counts, breath consumption, eye blink frequency, number of steps, skin conditions, organ functionality, and other measurable data. Household devices are embedded devices found in household products such as refrigerators, access doors, temperature controllers, sofas, chairs, mattresses, pillows, etc. Activity records may include data obtained from household devices regarding an individual's activity inside the house. Additionally, activity records may include data obtained from computing devices such as mobile phones, tablets, or laptops, and the like.

The personal history data or medium further includes a family tree medium for storing a virtual family tree formed based on family historical data of the individual, where the family historical data is mined from the reciprocal relationships listed in the biographical data and linked data of related personal identity from the reciprocal relationships.

The personal history data or medium further includes the personal history data perform scoring on the personal identity based on the virtual human value, the biographical data and the virtual family tree, such that the personal identity scoring will set or store at least one value for the personal virtual currency in the blockchain system to perform virtual transaction with other individual or corporations.

Computing devices such as mobile phones, tablets, laptops, or the like, may be used to record personal history data, including virtual human values, biographical data, and virtual family trees.

An alternative blockchain system may have personal history data that includes an autobiography. An "autobiography" is defined here as personal data that is recorded by an individual, like a self-assessment. The autobiography may include personal written notes, online chat history, social media activity, photos taken, interactions with other individuals, daily journals, and the like. For example, the alternative blockchain system includes a mobile wallet for storing at least one personal virtual currency based on a personal identity of the individual. The personal virtual currency includes a personal history medium having personal history data. The personal history data has a plurality of historical data of the individual. Further, the personal history data includes an autobiography. The autobiography is recorded on a computing device and then recorded on a blockchain. The personal history medium performs scoring on the personal identity based on the autobiography, such that the personal identity scoring will set or store at least one value for the personal virtual currency in the blockchain system to perform virtual transactions with other individuals or corporations.

Another alternative blockchain system may have personal history data that includes a biography. A "biography" is defined here as data recorded about an individual by other people. For example, the biography may include a description and discussion of the individual's life, information, incidents, dialogue, interaction with people. The individual's life story is told with respect to other people and events during the individual's life. The biography develops an understanding of the places, times, events, and other people during the individual's life. Further, the biography tells the individual's life story in a style and tone so that the reader or listener can relate to the individual. The biography develops a person as a real and interesting person, not a person or stereotypical member of a particular group. The biography may use different text structures such as a description, sequence, comparison, cause and effect, or problem/solution. The biography may also have informational text features such as headings, timelines, photographs, and captions. The biography is recorded on a computing device and then recorded on a blockchain. The personal history medium performs scoring on the personal identity based on the biography, such that the personal identity scoring will set or store at least one value for the personal virtual currency in the blockchain system to perform virtual transactions with other individuals or corporations.

In addition to the blockchain system, there are also methods for establishing the blockchain system. One example of a method of establishing a blockchain system is based on at least one individual, comprising the step of forming at least one personal virtual currency based on a personal identity of the individual in a virtual currency means. As aforementioned, a mobile wallet may be used as the virtual currency means for storing personal virtual currencies based on personal identities of individuals.

The method of establishing a blockchain system based on at least one individual further comprises the step of sorting at least one personal history data having a plurality of historical data of the individual in a personal history medium.

The method of establishing a block-chain system based on at least one individual further comprises the step of storing a virtual human value relating to the individual in a value medium, wherein the virtual human value mined and compiled from social status or social score of the individual, achievement achieved or award nominated by the individual, competency of the individual, academic status of the individual, and influencer score based affect that has the ability to influence decisions of others individual.

The method of establishing a block-chain system based on at least one individual further comprises the step of storing a biographical data relating to the personal identity having name, address, date of birth, gender, marital status, work experience, job scope, training or seminars attended, affiliations and reciprocal relationships in a biodata medium, wherein the biographical data further mined and sorted from health records, activity records, social network data, and personal records. As aforementioned, activity records include data collected from IOT embedded devices ("embedded devices") such as wearable tracking devices and household devices.

The method of establishing a blockchain system based on at least one individual further comprises the step of storing a virtual family tree formed based on family historical data of the individual in a family tree medium, where the family historical data mined from the reciprocal relationships listed in the biographical data and linking data of related personal identity from the reciprocal relationships.

Further, the personal history data performs scoring on the personal identity based on the virtual human value, the biographical data and the virtual family tree, such that the personal identity scoring will set or store at least one value for the personal virtual currency in the block-chain system to perform virtual transactions with other individual or corporations.

As illustrated in FIG. 1, a personal blockchain system 101 includes at least one personal virtual currency 102 based on a personal identity of the individual. A mobile wallet may be used for storing personal virtual currencies 102 based on personal identities of individuals. The personal virtual currency includes a personal history medium 106 having personal history data. The personal history data includes a plurality of historical data of the individual. The personal history data also includes a value medium for storing virtual human value 103 relating to the individual, mined and compiled from social status or social score of the individual, achievements achieved, awards nominated by the individual, competency of the individual, academic status of the individual, and an influencer score based effect that can influence decisions of other individuals. The personal history data further includes a biodata medium for storing biographical data 104 relating to the personal identity, including name, address, date of birth, gender, marital status, work experience, job scope, training or seminars attended, affiliations and reciprocal relationships, and further mined and sorted from health records, activity records, and social network data. The personal history data further includes a family tree medium based on family historical data of the individual, where the family historical data is mined and compiled from the family tree 105 and reciprocal relationships listed in the biographical data 104. The family historical data is further mined and compiled from linking data of related personal identity from the reciprocal relationships. Embedded devices may be used to track and record activity records. Computing devices such as mobile phones, tablets, or laptops may be used to record personal history data, including virtual human values, biographical data, and virtual family trees.

As illustrated in FIG. 2, the blockchain system is based on at least one individual, formed in a blockchain system based on multiple individual connected or liked together. Each blockchain is segmented into multiple blocks, such as a first block being personal virtual currency based on a personal identity of the individual, a second block being a personal history medium having at least one personal history data having a plurality of historical data of the individual, characterised in that the personal history data comprises: a combination of a virtual human value relating to the individual, and biographical data relating to the personal identity having name, address, date of birth, gender, marital status, work experience, job scope, training or seminars attended, affiliations and reciprocal relationships, wherein the biographical data further is mined and sorted from health records, activity records, social network data, and personal records. Further, the second block may be a family tree medium for storing a virtual family tree formed based on family historical data of the individual, where the personal identity scoring will set or store at least one value for the personal virtual currency in the blockchain system.

Figure 3:
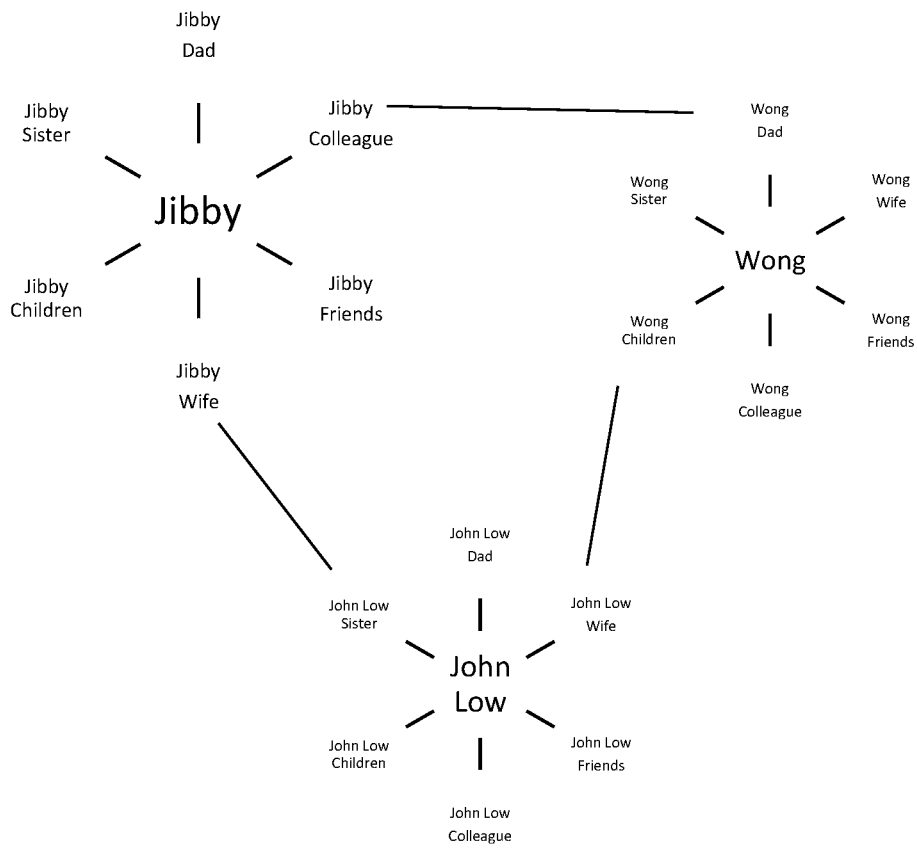
FIG. 3 illustrates a family tree medium formed based on family historical data of an individual.

As illustrated in FIG. 3, a blockchain system has a family tree medium formed based on family historical data of an individual. The family historical data is mined from the reciprocal relationships listed in the biographical data and linking data of related personal identity from the reciprocal relationships, such as interconnecting multiple individuals through family tree and reciprocal relationships connections. Here, the individuals Jibby, John Low, and Wong are linked to form a social interconnection. However, each individual Jibby, John Low, and Wong has historical data of the family tree, for example as a pedigree or ancestry chart. Family trees are often presented with the oldest generations at the top and the newer generations at the bottom. An ancestry chart, which is a tree showing the ancestors of an individual, will more closely resemble a tree in shape, being wider at the top than the bottom. In some ancestry charts, an individual appears on the left and his or her ancestors appear to the right. A descendancy chart, which depicts all the descendants of an individual will be narrowest at the top.

Further, the personal virtual currency may be linked to the individual's country scoring which relates to a country's economic activity or Gross Domestic Product (GDP) for the valuation of the personal virtual currency. Further, the personal virtual currency valued may be based on individual behaviour and activity, in which data relating to the individual behaviour and activity is mined from at least one tracking system or medium, or surveillance medium or system.

Further, the personal virtual currency valued may be based on merit and demerit point system which allows the individual to efficiently function as a contributing member of society. Further, the personal virtual currency may be valued based on a Further, the personal virtual currency may be valued based on an ability projection of the individual. Artificial Intelligence can perform the functions necessary to make ability projections. Further, the system may comprise opportunity scoring means for calculating scoring based on the virtual human value for the valuation of the personal virtual currency.

Further, the system may comprise a connection medium for trace family tree and establish virtual establishing for communication and interaction with the individual. Further, the family tree medium may be used for the valuation of the personal virtual currency. Further, the valuation of the personal virtual currency may be based on a government's records of the individual, or the individual and the reciprocal relationships of the individual.

The present invention may be embodied in other specific forms without departing from its essential characteristics. The described embodiments are to be considered in all respects only as illustrative and not restrictive. The scope of the invention is, therefore indicated by the appended claims rather than by the foregoing description. All changes, which come within the meaning and range of equivalency of the claims, are to be embraced within their scope.

Throughout this specification, unless the context requires otherwise, the word "comprise", or variations such as "comprises" or "comprising", will be understood to imply the inclusion of a stated step or element or integer or group of steps or elements or elements or integers, but not the exclusion of any other step or element or integer or group of steps, elements or integers. Thus, in the context of this specification, the term "comprising" is used in an inclusive sense and thus should be understood as meaning "including, but not limited to."

The invention claimed is:

1. A blockchain system based on at least one individual, comprising:
   A. a mobile wallet for storing at least one personal virtual currency based on a personal identity of the individual, wherein the personal virtual currency comprises:
      i. a personal history medium comprising at least one personal history data, wherein the personal history data comprises a plurality of historical data of the individual, and wherein the personal history data further comprises:
         a. a value medium for storing a virtual human value relating to the individual, wherein the virtual human value is mined and compiled from social status or social score of the individual, achievements achieved, awards nominated by the individual, competency of the individual, academic status of the individual, and an influencer score based effect that can influence decisions of other individuals;
         b. a biodata medium for storing a biographical data relating to the personal identity, wherein the biographical data is mined and compiled from name, address, date of birth, gender, marital status, work experience, job scope, training or seminars attended, affiliations and reciprocal relationships, and wherein the biographical data is further mined and compiled from health records, activity records, and social network data;
         c. a family tree medium for storing a virtual family tree formed based on family historical data of the individual, wherein the family historical data is mined and compiled from the reciprocal relationships listed in the biographical data, and wherein the family historical data is further mined and compiled from linking data of related personal identity from the reciprocal relationships;
   B. at least one embedded device for tracking the activity records;
   C. wherein the personal history medium performs scoring on the personal identity based on the virtual human value, the biographical data and the virtual family tree, such that the personal identity scoring will set or store at least one value for the personal virtual currency in the blockchain system to perform virtual transactions with other individuals or corporations;
   D. wherein the at least one embedded device comprises at least one of: a wearable tracking device and a household device; and
   E. wherein the activity records include measurable data pertaining to the individual.

2. The blockchain system of claim 1, wherein the personal virtual currency is linked to the individual's country scoring which relates to a country's economic activity or Gross Domestic Product (GDP) for the valuation of the personal virtual currency.

3. The blockchain system of claim 1, wherein the personal virtual currency is valued based on individual behaviour and activity, in which data relating to the individual behaviour and activity is mined from at least one tracking system or surveillance system.

4. The blockchain system of claim 1, wherein the personal virtual currency is valued based on a merit and demerit point system which allows the individual to efficiently function as a contributing member of society.

5. The blockchain system of claim 1, wherein the personal virtual currency is valued based on an ability projection of the individual.

6. The blockchain system of claim 1, wherein the blockchain system further comprises opportunity scoring means for calculating scoring based on the virtual human value for the valuation of the personal virtual currency.

7. The blockchain system of claim 1, wherein the blockchain system further comprises a connection medium for a trace family tree and for establishing a virtual connection for communication and interaction with the individual.

8. The blockchain system of claim 1, wherein the family tree medium is used for the valuation of the personal virtual currency.

9. The blockchain system of claim 1, wherein the valuation of the personal virtual currency is based on a government's records of the individual, or the individual and the reciprocal relationships of the individual.

10. A method of establishing a blockchain system based on at least one individual, comprising the steps of:
   forming at least one personal virtual currency based on a personal identity of the individual;
   storing the personal virtual currency in a mobile wallet;
   sorting at least one personal history data, the personal history data having a plurality of historical data of the individual in a personal history medium, which comprises the steps of:
      storing a virtual human value relating to the individual in a value medium, wherein the virtual human value is mined and compiled from social status or social score of the individual, achievements achieved, awards nominated by the individual, competency of the individual, academic status of the individual, and an influencer score based effect that can influence decisions of others individual;
   storing biographical data relating to the personal identity having name, address, date of birth, gender, marital status, work experience, job scope, training or seminars attended, affiliations and reciprocal relationships in a biodata medium, wherein the biographical data is further mined and sorted from health records, activity records, social network data, and personal records;
   tracking the activity records using at least one embedded device, wherein the at least one embedded device comprises at least one of: a wearable tracking device and a household device, and wherein the activity records include measurable data pertaining to the individual; and
   storing a virtual family tree formed based on family historical data of the individual in a family tree medium, where the family historical data mined from the reciprocal relationships listed in the biographical data, and linking data of related personal identity from the reciprocal relationships,
in which the personal history medium having the personal history data performs scoring on the personal identity based on the virtual human value, the biographical data and the virtual family tree, such that the personal identity scoring will set or store at least one value for the personal virtual currency in the blockchain system to perform virtual transactions with other individual or corporations.

\* \* \* \* \*